(12) United States Patent
Kato et al.

(10) Patent No.: US 7,034,882 B2
(45) Date of Patent: Apr. 25, 2006

(54) ELECTRONIC CAMERA

(75) Inventors: Koji Kato, Tama (JP); Naoki Fujii, Hachioji (JP)

(73) Assignee: Olympus Corporation, Tokyo (JP)

( * ) Notice: Subject to any disclaimer, the term of this patent is extended or adjusted under 35 U.S.C. 154(b) by 803 days.

(21) Appl. No.: 09/838,082

(22) Filed: Apr. 19, 2001

(65) Prior Publication Data

US 2002/0031343 A1  Mar. 14, 2002

(30) Foreign Application Priority Data

Apr. 24, 2000  (JP) ............................. 2000-123101

(51) Int. Cl.
*H04N 5/225* (2006.01)
*G02B 13/16* (2006.01)

(52) U.S. Cl. ...................... 348/335; 348/340

(58) Field of Classification Search ........ 348/371–376, 348/335, 340, 343; 250/238, 239; 62/259.2; 167/47, 185
See application file for complete search history.

(56) References Cited

U.S. PATENT DOCUMENTS

| | | | |
|---|---|---|---|
| 4,972,265 A * | 11/1990 | Tanaka et al. | 348/230.1 |
| 6,778,218 B1 * | 8/2004 | Higuchi et al. | 348/344 |
| 6,803,961 B1 * | 10/2004 | Ezawa et al. | 348/340 |

FOREIGN PATENT DOCUMENTS

| | | | |
|---|---|---|---|
| JP | 7-154658 | | 6/1995 |
| JP | 08009208 A | * | 1/1996 |
| JP | 9-65348 | | 3/1997 |
| JP | 09065348 A | * | 3/1997 |
| JP | 11-341321 | | 12/1999 |
| JP | 11341321 A | * | 12/1999 |

OTHER PUBLICATIONS

Abstract and Translation of JP 09-065348.*
Abstract and Translation of JP 08-009208.*
Abstract and Machine Translation of JP 11-34132.*

* cited by examiner

*Primary Examiner*—David Ometz
*Assistant Examiner*—Yogesh Aggarwal
(74) *Attorney, Agent, or Firm*—Straub and Pokotylo; John C. Pokotylo

(57) ABSTRACT

A photographic lens system for forming an object image is placed in the lens barrel of an electronic camera. In a camera body, a beam splitter for forming branched optical paths and an image sensing element for photoelectrically converting the formed object image are arranged. The beam splitter and the image sensing element are attached and disposed in the outer casing by a holding frame structure. The photographic lens system is attached and disposed in the lens barrel, which has a heat-radiating barrel made of aluminum. A heat-transfer path from the image sensing element to the heat-radiating barrel is formed by a back plate and a prism frame both made of aluminum, which are part of the holding frame structure.

14 Claims, 8 Drawing Sheets

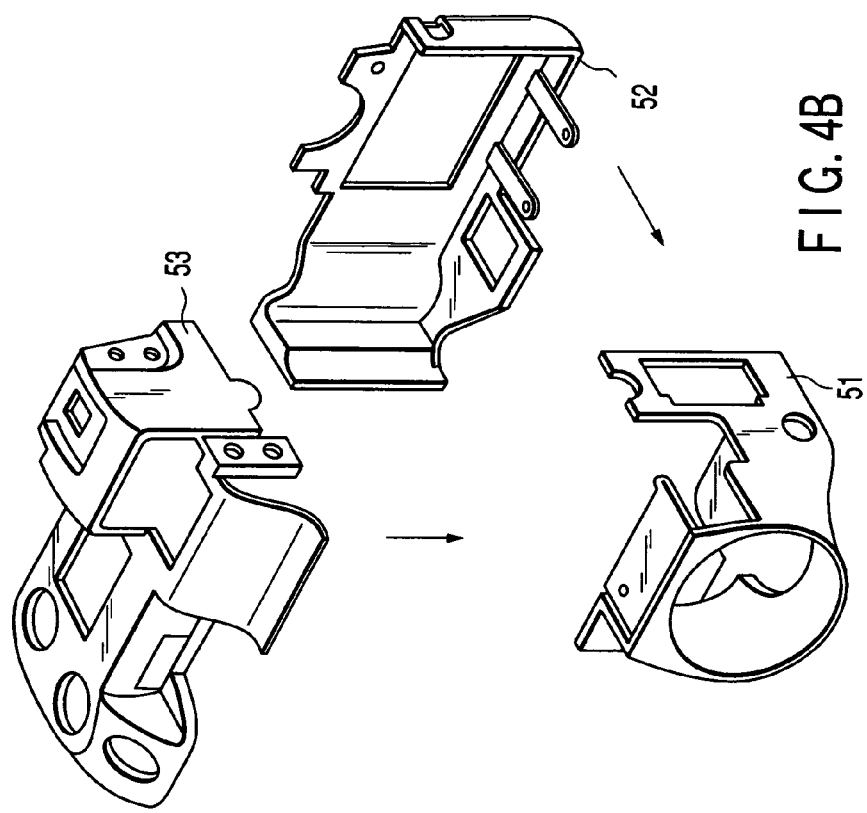
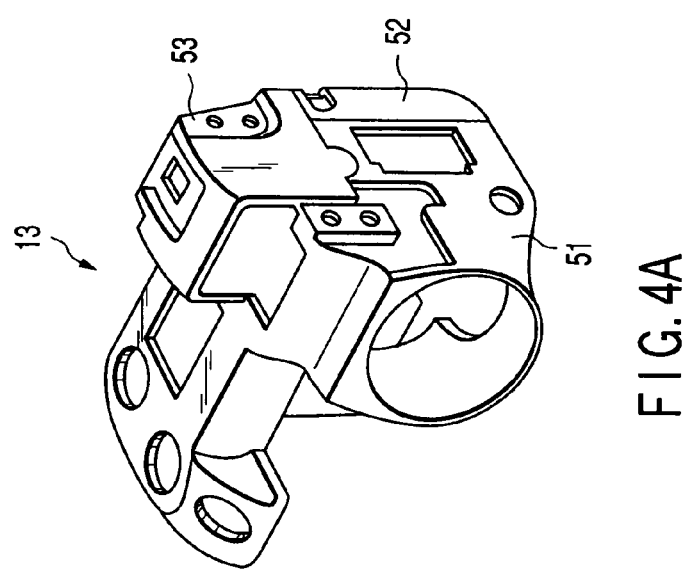
FIG. 4B
FIG. 4A

ELECTRONIC CAMERA

CROSS-REFERENCE TO RELATED APPLICATIONS

This application is based upon and claims the benefit of priority from the prior Japanese Patent Application No. 2000-123101, Apr. 24, 2000, the entire contents of which are incorporated herein by reference.

BACKGROUND OF THE INVENTION

The present invention relates to an electronic camera and, more particularly, to an electronic camera capable of preventing deterioration of the picture quality due to a rise of the temperature of an image sensing element, and at the same time allowing the internal structure of the apparatus to be flexibly made compact.

In an electronic camera, heat is generated from portions consuming electric energy, such as an image sensing element for photoelectrical conversion, e.g., CCD, and a printed circuit board. Especially, the image sensing element generates a large amount of heat, which becomes more prominent, as the pixel density of the image sensing element is increased. However, as various kinds of members are closely mounted in the electronic camera, the effect of convection currents of air can be hardly expected. As a result, the temperature of the image sensing element, which is disposed deep in the electronic camera, tends to rise.

A rise of the temperature of the image sensing element increases the noise of the image sensing element, thereby causing deterioration of the picture quality. In particular, where the image sensing element has a high pixel density, a rise of the temperature of the image sensing element is a big problem, because such an image sensing element is required to have a high picture quality.

To solve these problems, there is a technique known in that a back plate supporting an image sensing element is used as a heat-radiating plate. Furthermore, for example, as a prior art to solve the same problems, Jpn. Pat. Appln. KOKAI Publication No. 7-154658 discloses a video camera in which a CCD is attached to an apparatus casing by an attaching member made of a heat-conducting material, so that heat generated by the CCD is radiated from the apparatus casing. Jpn. Pat. Appln. KOKAI Publication No. 9-65348 discloses a solid image sensing apparatus in which a Peltier cooling element is disposed behind a solid image sensing element. Jpn. Pat. Appln. KOKAI Publication No. 11-341321 discloses an image sensing apparatus in which an attaching member that supports an image sensing element and is made of a heat-conducting material is elastically brought into contact with an apparatus casing, so that heat generated by the image sensing element is radiated from the apparatus casing.

A heat-radiating plate (i.e., a back plate) that supports an image sensing element has a small thermal capacity, and thus provides a small heat-radiating effect. Where such a heat-radiating plate is extended to release heat to an apparatus casing, the layout of members in the apparatus is greatly restricted. If the heat of an image sensing element cannot be efficiently released, the temperature of the image sensing element rises, thereby deteriorating the picture quality. On the other hand, if the internal structure of the apparatus cannot be flexibly made compact, it is not difficult to satisfy demands on an electronic camera in recent years, for higher compactness, improved productivity, and lower price. That is, the conventional structure in which a back plate that supports an image sensing element is substantially extended to release the heat of the image sensing element to an apparatus casing still has antinomic problems: improving the picture quality and making the apparatus compact.

BRIEF SUMMARY OF THE INVENTION

The present invention has been made in consideration of these problems of the prior art, and has as its object to provide an electronic camera capable of preventing deterioration of the picture quality due to a rise of the temperature of an image sensing element, and at the same time allowing the internal structure of the apparatus to be flexibly made compact.

According to a first aspect of the present invention, there is provided an electronic camera comprising
a photographic lens configured to form an object image,
an image sensing element configured to photoelectrically convert the formed object image,
a light guiding device configured to guide incident light from an object, which is incident from the photographic lens, to a first optical path to the image sensing element and a second optical path different from the first optical path,
a holding frame structure configured to surround the image sensing element and the light guiding device, the holding frame structure comprising an intimately contacting member made of a heat-conducting material and intimately contacting with the image sensing element, and
a lens casing configured to accommodate the photographic lens, the lens casing comprising a heat-radiating portion made of a heat-conducting material and configured to radiate heat to an outside of the camera,
wherein the holding frame structure and the lens casing are arranged such that heat from the intimately contacting member is conducted to the heat-radiating portion.

According to a second aspect of the present invention, there is provided an electronic camera comprising
a photographic lens configured to form an object image,
an image sensing element configured to photoelectrically convert the formed object image,
a light guiding device configured to guide incident light from an object, which is incident from the photographic lens, to a first optical path to the image sensing element and a second optical path different from the first optical path,
a holding frame structure configured to surround the image sensing element and the light guiding device, the holding frame structure comprising an intimately contacting member made of a heat-conducting material and intimately contacting with the image sensing element,
an outer casing configured to accommodate the image sensing element, the light guiding device, and the holding frame structure, the outer casing comprising a heat-radiating portion made of a heat-conducting material and configured to radiate heat to an outside of the camera, and
a lens casing configured to accommodate the photographic lens, the lens casing comprising a heat-radiating portion made of a heat-conducting material and configured to radiate heat to an outside of the camera,
wherein the holding frame structure, the outer casing, and the lens casing are arranged such that heat from the intimately contacting member is conducted to both the heat-radiating portions.

According to a third aspect of the present invention, there is provided an electronic camera comprising
a photographic lens configured to form an object image,
an image sensing element configured to photoelectrically convert the formed object image, a light guiding device configured to guide incident light from an object, which is incident from the photographic lens, to a first optical path to the image sensing element and a second optical path different from the first optical path, a holding frame structure configured to surround the image sensing element and the light guiding device, the holding frame structure comprising an intimately contacting member formed of a plate member, which is made of a heat-conducting material and intimately contacts with the image sensing element, and a heat-transfer frame member formed of a box member, which is made of heat-conducting material, surrounds the light guiding device, and is thermally connected to the intimately contacting member, and an outer casing configured to accommodate the image sensing element, the light guiding device, and the holding frame structure, the outer casing comprising a heat-radiating portion made of a heat-conducting material and configured to radiate heat to an outside of the camera, wherein the holding frame structure and the outer casing are arranged such that the heat-radiating portion is thermally connected to the heat-transfer frame member, and heat from the intimately contacting member is conducted to the heat-radiating portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are perspective views showing the assembled state and disassembled state, respectively, of a casing used in a camera body of the electronic camera shown in FIG. 1;

DETAILED DESCRIPTION OF THE INVENTION

Figure 1:
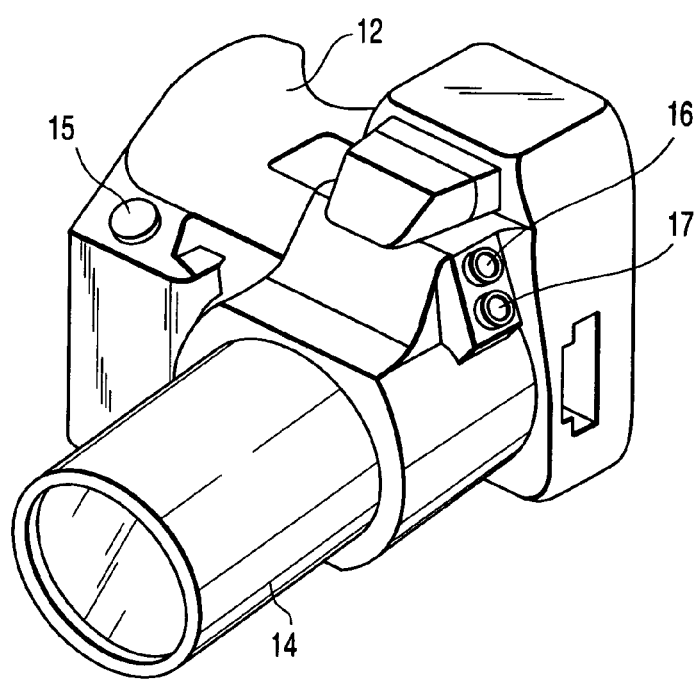
FIG. 1 is a perspective view showing the external appearance of an electronic camera according to an embodiment of the present invention.

Embodiments of the present invention will be described below with reference to the accompanying drawings. In the following explanation, the same reference numerals denote components having substantially the same functions and configurations, and a duplicate explanation will be made only where necessary.

Figure 2:
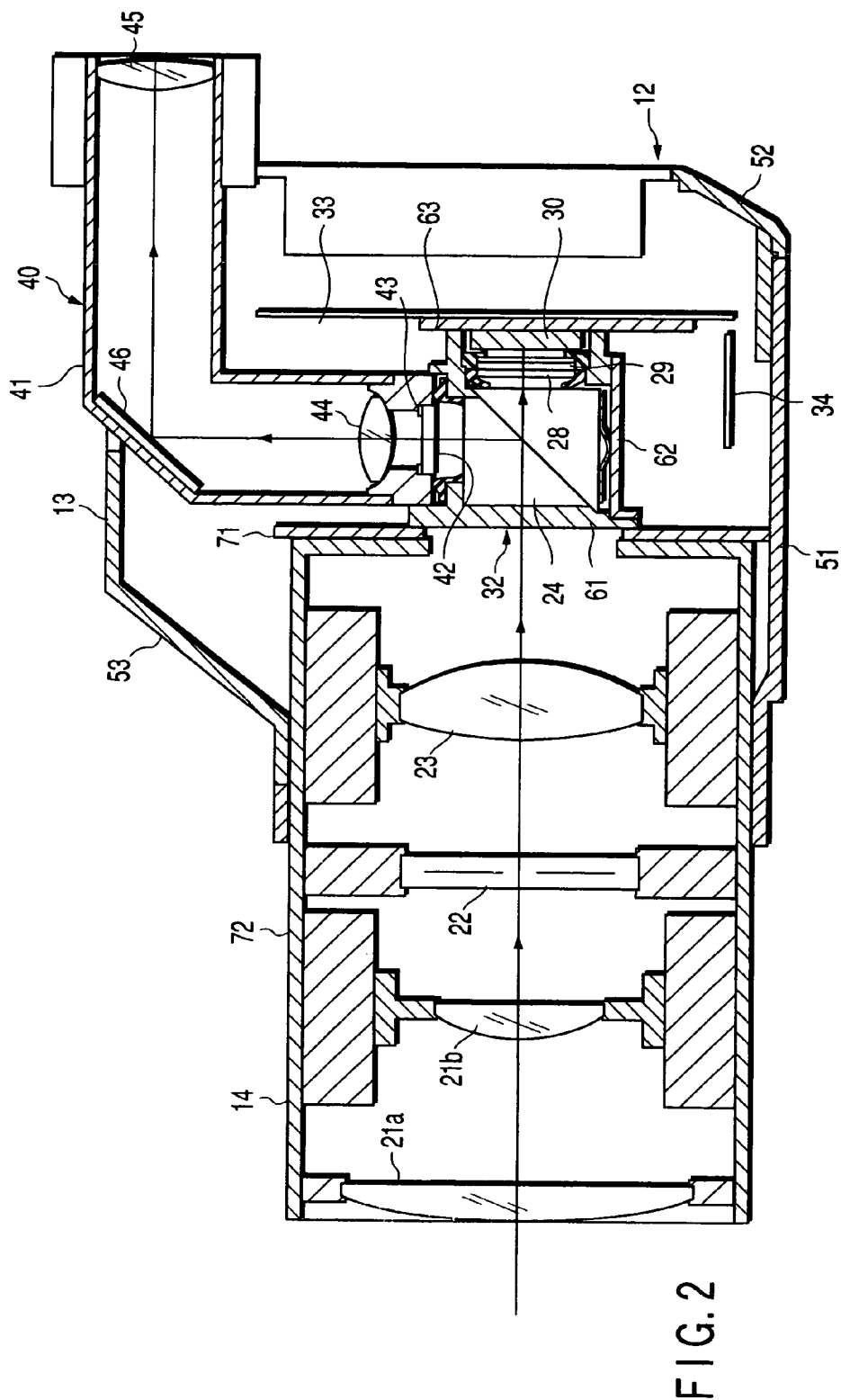
FIG. 2 is a sectional view showing the internal structure of the electronic camera shown in FIG. 1.
Figure 3:
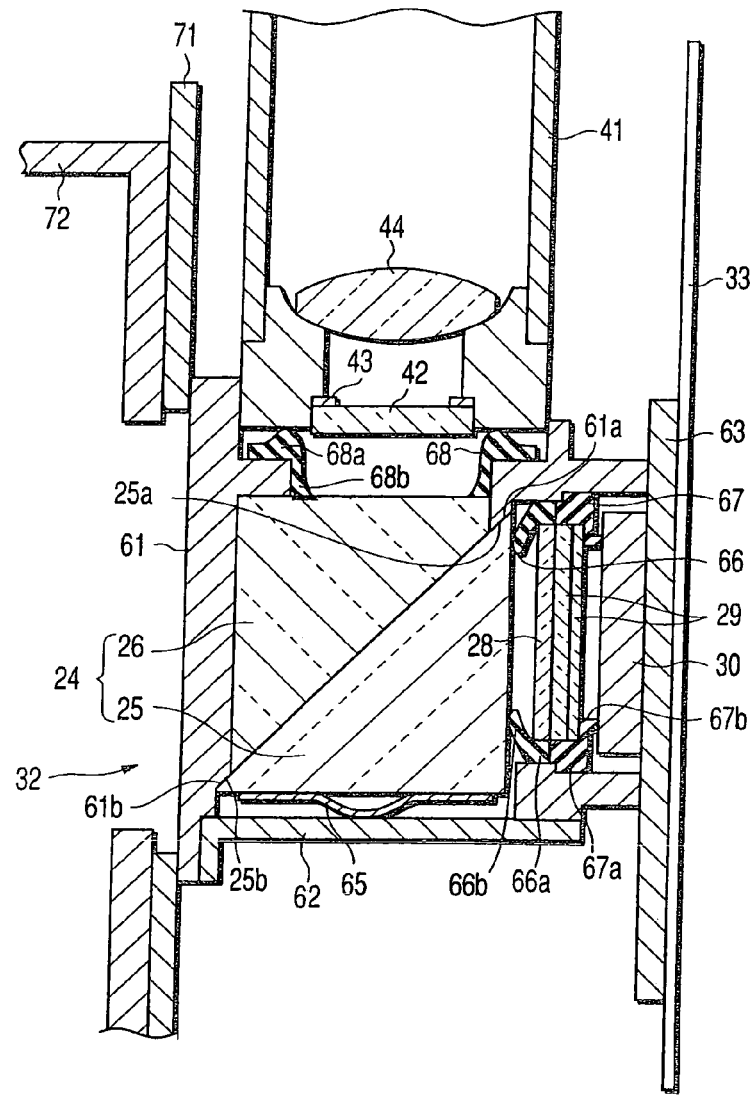
FIG. 3 is an enlarged sectional view showing the main parts of the structure shown in FIG. 2.

FIG. 1 is a perspective view showing the outer appearance of an electronic camera according to an embodiment of the present invention. FIG. 2 is a sectional view showing the internal structure of the electronic camera. FIG. 3 is an enlarged sectional view showing the main parts of the electronic camera. As shown in FIG. 1, this electronic camera 10 includes a camera body 12, and a lens barrel 14 detachably attached to the front surface of a casing 13 of the body 12. FIG. 1 also shows a two-step release switch 15 for starting photographing, and a release terminal 16 and a strobe terminal 17 for connecting lines for remotely controlling release and strobe operations.

In the lens barrel 14, zoom lenses 21a and 21b, a stop 22, and a focusing lens 23 are arranged in this order from the incident light side. The zoom lenses 21a and 21b and the focusing lens 23 construct a photographic lens system for forming an object image (in FIG. 2, the arrangement of these lenses is schematically shown).

At the entrance of the camera body 12, a beam splitter 24 (light guiding device or light splitting device) for splitting an incident optical image from the photographic lens system toward a CCD image sensing element 30 and an optical finder unit 40 is placed. This beam splitter 24 is formed by combining two prisms, i.e., lower and upper prisms 25 and 26. The CCD image sensing element (photoelectric conversion element) 30 photoelectrically converts the incident object image formed on the image sensing surface, and outputs it as an electrical signal.

Two optical filters 28 and 29 are inserted between the beam splitter 24 and the image sensing element 30. The filter 28 is an IR cut filter for cutting infrared radiation, which is formed by deposition on a glass surface. The filter 29 is a low-pass filter for preventing moiré, which is formed by stacking two or more quartz plates. These filters 28 and 29 are integrated by adhesion.

The beam splitter 24, the optical filters 28 and 29, and the image sensing element 30 are installed in a form to be described later in the camera body 12 by a holding frame structure 32. A first printed circuit board 33 is placed at the back of this holding frame structure 32, and the image sensing element 30 is connected to this first printed circuit board 33. In addition, a second printed circuit board 34 is placed below the holding frame structure 32 so as to form a right angle to the first printed circuit board 33.

An optical finder unit 40 is attached to the holding frame structure 32 in accordance with the optical path branched upward by the beam splitter 24. This optical finder unit 40 includes a finder frame 41 bent at a right angle. A focusing plate 42 for focusing and a field frame plate 43 are attached to that side of the finder frame 41, which faces the beam splitter 24. In this finder frame 41, a plurality of lenses 44 and 45 and a mirror 46 are arranged (the lens arrangement is schematically shown in FIG. 2). The light beam split toward the optical finder unit 40 by the beam splitter 24 is guided to a finder window at the back of the camera body 12 via these optical members.

An image display LCD 18 is placed in the middle of the back surface of the camera body 12. This image display LCD 18 is used as a photographic finder in recording mode and as a monitor for reproducing a recorded photographed picture in playback mode.

FIG. 4A is a perspective view showing the assembled state of the casing 13 of the camera body 12. FIG. 4B is a perspective view showing the disassembled state of the casing 13. As shown in FIGS. 4A and 4B, this casing 13 is composed of a front cover 51, a rear cover 52, and an upper cover 53, all of which are metal products having a high thermal conductivity, e.g., aluminum diecast products. These covers 51, 52, and 53 are joined by using known screw members (not shown). The covers 51, 52, and 53 are thermally connected as their contact surfaces intimately contact with each other, thereby constructing an integrated heat-radiating casing having large thermal capacity, i.e., the casing 13, for radiating heat to the outside of the camera.

Figure 5:
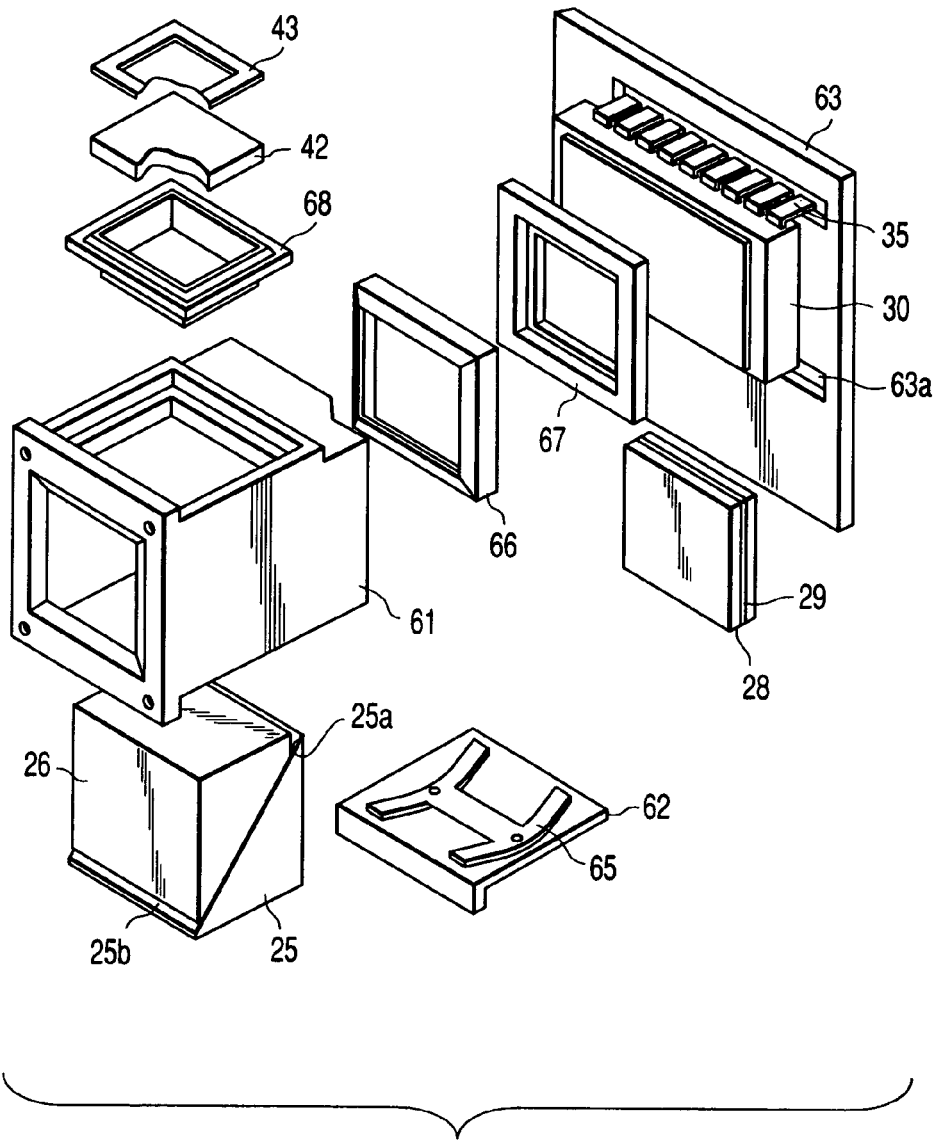
FIG. 5 is a perspective view showing the disassembled state of a holding frame structure used in the electronic camera shown in FIG. 1.

FIG. 5 is a perspective view showing the disassembled state of the holding frame structure 32. As shown in FIGS. 3 and 5, this holding frame structure 32 includes a prism frame (heat-transfer frame member) 61, a bottom plate 62, and a rear plate 63, all of which are metal products having a high thermal conductivity, e.g., aluminum diecast products. The holding frame structure 32 also includes filter caps 66 and 67 and a sealing member 68 assembled inside the prism frame 61. All of the filter caps 66 and 67 and the sealing member 68 are products made from highly elastic materials, e.g., synthetic rubber molded products.

The prism frame 61 is so constructed as to insert the beam splitter 24 from the lower opening of this prism frame 61. The bottom plate 62 is fastened to the prism frame 61 by using known screw members (not shown) so as to close this lower opening. The prism frame 61 and the bottom plate 62 are thermally connected as their contact surfaces intimately contact with each other, thereby constructing an integrated heat-transfer frame member having large thermal capacity.

On the bottom surface 62, a leaf spring 65 for pressing the beam splitter 24 in a biased state at a predetermined position is disposed. The lower prism 25 is positioned by the biasing force of this leaf spring 65. In this state, those contact surfaces 25a and 25b at the upper and lower edges of the reference oblique surface of the lower prism 25, which protrude from the upper prism 26, contact with corresponding stop surfaces 61a and 61b, respectively, formed on the prism frame 61. The upper prism 26 is positioned as it is pushed against the reference oblique surface of the lower prism 25 by the sealing member 68.

The rear plate 63 is much larger than the image sensing element 30 and intimately contacts with the rear surface of the image sensing element 30. This rear plate 63 is fastened to the prism frame 61 by using known screw members (not shown) so as to close the rear opening of the prism frame 61. The rear plate 63 is thermally connected to the prism frame 61 as their contact surfaces intimately contact with each other, thereby forming a thick heat-transfer path from the rear plate 63 to the prism frame 61. A pair of slits 63a are formed in this rear plate 63. A lead frame 35 for electrically connecting the image sensing element 30 and the printed circuit board 33 is disposed through these slits 63a.

Figure 6:
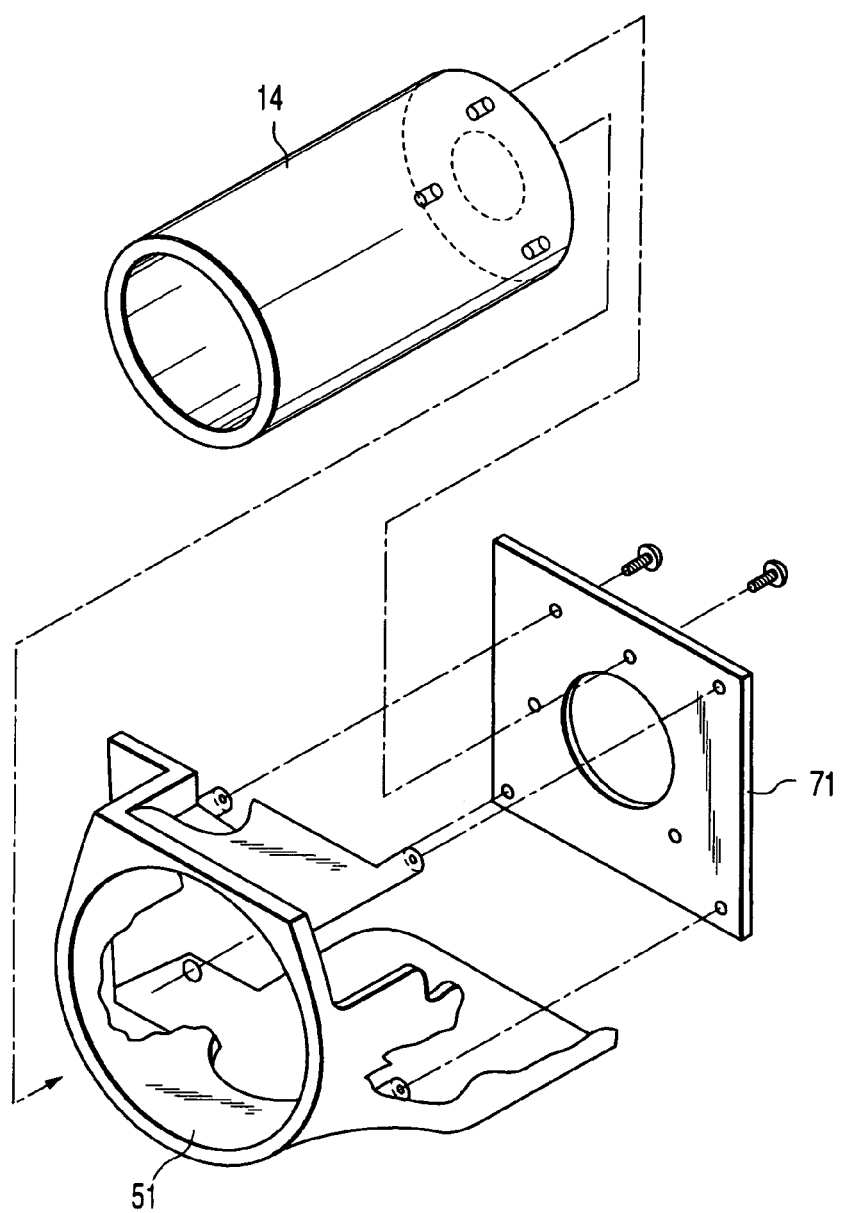
FIG. 6 is a perspective view showing the relationship between a front plate of the holding frame structure, a lens barrel, and a front cover of the casing in the electronic camera shown in FIG. 1.

As shown in FIGS. 3 and 6, the holding frame structure 32 further includes a front plate 71 placed on the front side of the prism frame 61. This front plate 71 is a metal product having a high mechanical strength and a high thermal conductivity, e.g., a steel plate product. FIG. 6 is a perspective view showing the relationship between the front plate 71 of the holding frame structure 32, the lens barrel 14, and the front cover 51 of the casing 13.

The prism frame 61 is fastened to the front plate 71 by using known screw members (not shown). This prism frame 61 is thermally connected to the front plate 71 as their contact surfaces intimately contact with each other, thereby forming a thick heat-transfer path from the prism frame 61 to the front plate 71. Furthermore, the front plate 71 is fastened to the front cover 51 of the casing 13 by using known screw members (some screw members are shown in FIG. 6). This front plate 71 is thermally connected to the front cover 51 as their contact surfaces intimately contact with each other, thereby forming a thick heat-transfer path from the front plate 71 to the front cover 51.

Also, a portion of the lens barrel 14 constructs a heat-radiating barrel 72 for radiating heat to the outside of the camera. This heat-radiating barrel 72 is made of a thermally conductive material, e.g., aluminum. The rest of the lens barrel 14 is formed with a synthetic resin. The heat-radiating barrel 72 is fastened to the front plate 71 by using known screw members (not shown). This lens barrel 72 is thermally connected to the front plate 71 as their contact surfaces intimately contact with each other, thereby forming a thick heat-transfer path from the front plate 71 to the heat-radiating barrel 72.

As described above, a thick heat-transfer path is formed from the image sensing element 30 to the casing 13 of the camera body 12 and to the heat-radiating barrel 72 of the lens barrel 14, both having large thermal capacity, via the holding frame structure 32 which includes, e.g., the prism frame 61 having large thermal capacity. Since the heat generated by the image sensing element 30 is rapidly released to the outside of the camera through this heat-transfer path, it is possible to prevent a rise of the temperature of the image sensing element 30 and thereby prevent deterioration of the picture quality. In particular, the lens barrel 14 has a large exposure area to the outside and hence has a high heat-radiating effect. Note that the members such as the prism frame 61 of the holding frame structure 32 forming the heat-transfer path and the casing 13 and the heat-radiating barrel 72 for radiating heat to the outside of the camera are all originally necessary members. Therefore, the internal structure of the apparatus can be flexibly made compact without adding any extra members.

Referring back to FIG. 5, the filter caps 66 and 67 assembled inside the prism frame 61 are separately molded products and fastened to the front and rear sides, respectively, of the integrated filters 28 and 29. These filter caps 66 and 67 are inserted, as they hold the filters 28 and 29, into the prism frame 61 from its rear opening, before the rear plate 63 is attached to the prism frame 61. The filter cap 66 is positioned by abutting it against the exit surface of the beam splitter 24. The filter cap 67 is positioned by abutting it against an internal stop surface 61c of the prism frame 61.

As shown in FIG. 3, the filter cap 66 has as its main portion a surrounding portion 66a for holding the filter 28 by surrounding it. In addition, this filter cap 66 has an extended portion 66b which intimately contacts with the perimeter of the exit surface of the beam splitter 24 by elastic deformation, thereby forming, between the filter 28 and the beam splitter 24, a substantially closed space through which incident light to the image sensing element 30 passes. Similarly, the filter cap 67 has as its main portion a surrounding portion 67a for holding the filter 29 by surrounding it. This filter cap 67 also has an extended portion 67b which intimately contacts with the perimeter of the image sensing surface of the image sensing element 30 by elastic deformation, thereby forming, between the filter 29 and the image sensing element 30, a substantially closed space through which incident light to the image sensing element 30 passes.

The beam splitter 24, the filters 28 and 29, and the image sensing element 30 are assembled against the elasticity of the filter caps 66 and 67. Consequently, the surrounding portions 66a and 67a intimately contact with the beam splitter 24 and the image sensing element 30, respectively.

Since the filter caps 66 and 67 surround the whole perimeters of the filters 28 and 29, it is possible to reliably prevent damage to the edges of these filters 28 and 29 and thereby prevent the generation of particles. Also, since the filter caps 66 and 67 form a substantially closed space surrounding the optical path between the beam splitter 24 and the image sensing element 30, deterioration of the picture quality caused by invasion and adhesion of dust can be prevented. Furthermore, the filter caps 66 and 67 and the sealing member 68 intimately contact only with the beam splitter 24 and the image sensing element 30. This facilitates disassembling the beam splitter 24, the filters 28 and 29, and the image sensing element 30, when any of these components is to be replaced. Although the filter caps 66 and 67 are separate members in this embodiment, they can also be an integrated member.

The sealing member 68 is attached to the upper opening of the prism frame 61 which opens to the optical finder unit 40. This sealing member 68 has a flange portion 68a in its upper portion. The sealing member 68 is positioned by clamping this flange portion 68a in an intimate contact state between the prism frame 61 and the finder frame 41. The sealing member 68 also has a cylindrical portion 68b which intimately contacts with the perimeter of the exit surface of the beam splitter 24 by elastic deformation, thereby forming, between the focusing plate 42 and the beam splitter 24, a substantially closed space through which incident light to the optical finder unit 40 passes.

The beam splitter 24 and the finder frame 41 are assembled against the elasticity of the sealing member 68. Consequently, the sealing member 68 intimately contacts with the beam splitter 24 and the finder frame 41.

That is, a substantially closed space is also formed for the optical finder unit 40, in the vicinity of the focusing plate 42, by the sealing member 68. Therefore, deterioration of the quality of a finder image caused by invasion and adhesion of dust can be prevented. Additionally, since the sealing member 68 intimately contacts only with the beam splitter 24, disassembly of the parts around this beam splitter 24 is not interfered with.

In the above embodiment, aluminum is used as the material of the front cover 51, the rear cover 52, and the upper cover 53 of the casing 13 and the prism frame (heat-transfer frame member) 61, the bottom plate 62, and the rear plate 63 of the holding frame structure 32, from the viewpoint of thermal conductivity and light weight. However, similar effects can be obtained even when zinc or magnesium is used as the material of these parts.

Figure 7:
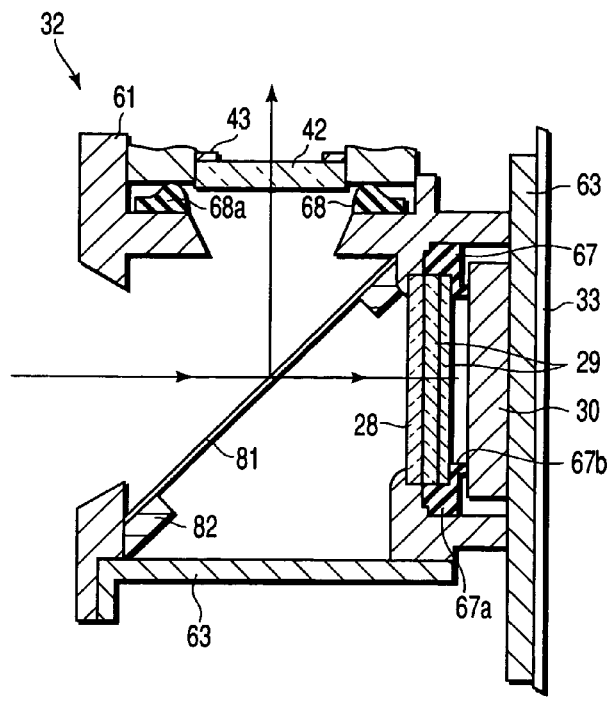
FIG. 7 is an enlarged sectional view showing the main parts, which correspond to those shown in FIG. 3, of an electronic camera according to another embodiment of the present invention.

FIG. 7 is an enlarged sectional view showing the main parts, which correspond to those shown in FIG. 3, of an electronic camera according to another embodiment of the present invention. This embodiment differs from the embodiment shown in FIG. 3, in that a half mirror 81 is used as a light guiding device for guiding an object image incident from a photographic lens system toward a CCD image sensing element 30 and an optical finder unit 40. The half mirror 81 works as a light splitting device for splitting incident light from the photographic lens system toward the CCD image sensing element 30 and the optical finder unit 40. The half mirror 81 is fixed to a heat-transfer frame member 61 of a holding frame structure 32 by a rectangular mirror frame 82. As the half mirror 81, a member of a thin film or plate may be used.

Figure 8:
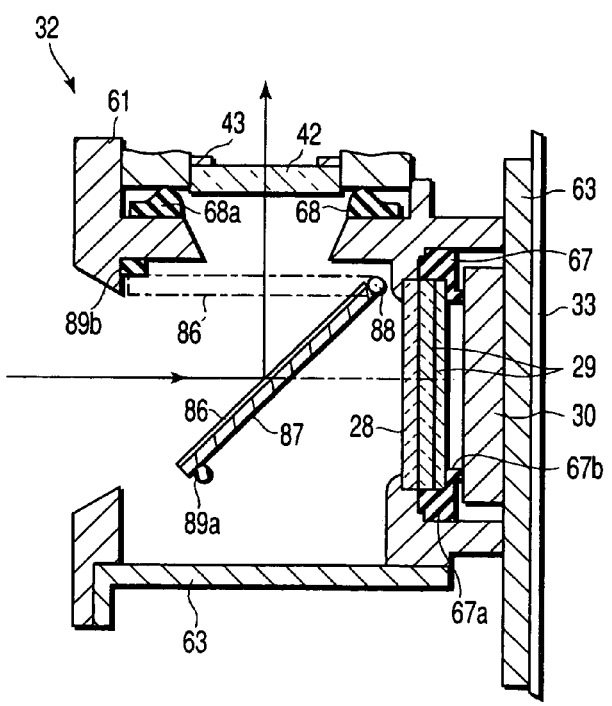
FIG. 8 is an enlarged sectional view showing the main parts, which correspond to those shown in FIG. 3, of an electronic camera according to still another embodiment of the present invention.

FIG. 8 is an enlarged sectional view showing the main parts, which correspond to those shown in FIG. 3, of an electronic camera according to still another embodiment of the present invention. This embodiment differs from the embodiment shown in FIG. 3, in that a quick return mirror 86 is used as a light guiding device for guiding an object image incident from a photographic lens system toward a CCD image sensing element 30 and an optical finder unit 40. The quick return mirror 86 works as an optical path switching device for switching first and second states in which incident light from the photographic lens system is output to the CCD image sensing element 30 and the optical finder unit 40, respectively.

The mirror 86 is attached to a mirror frame 87, which is rotated about an axial portion 88 supported by a holding frame structure 32, between a lower stopper 89a and an upper stopper 89b (see the positions indicated by solid lines and one-dot-chain lines in FIG. 8). When the mirror 86 is at the position indicated by the solid lines, the incident light is reflected by the mirror 86 and is output to the optical finder unit 40. When the mirror 86 is at the position indicated by the one-dot-chain lines, the incident light is not reflected by the mirror 86 but is output to the CCD image sensing element 30.

Figure 9:
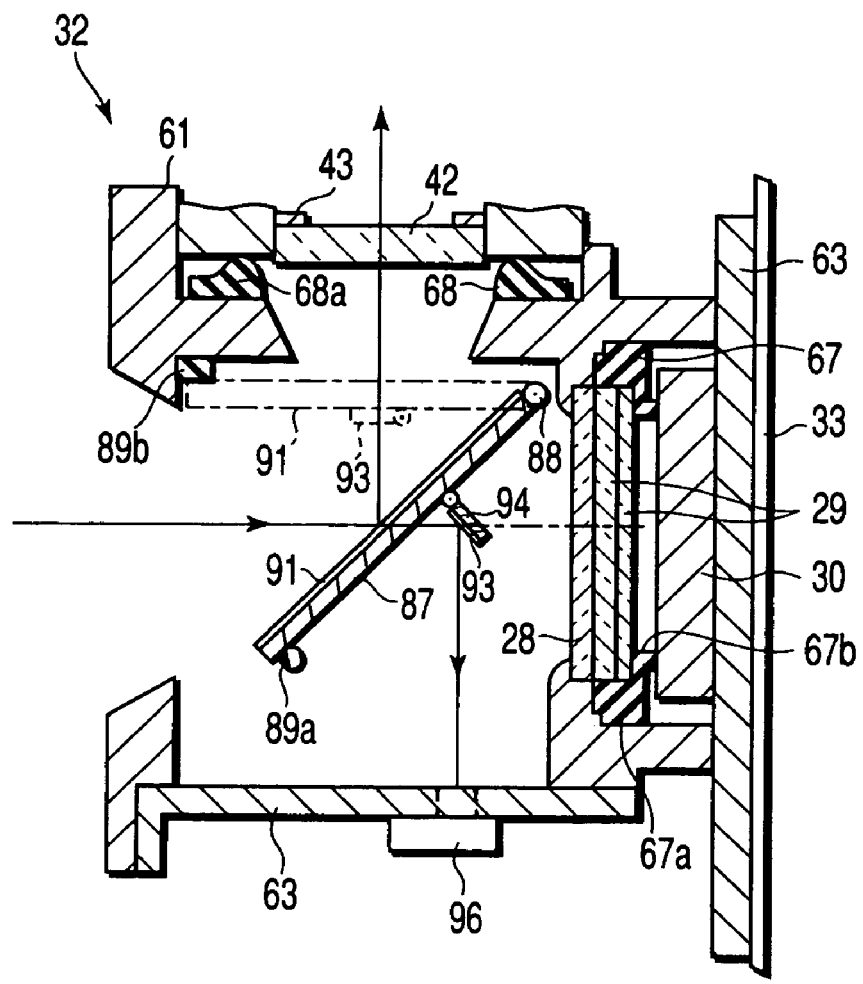
FIG. 9 is an enlarged sectional view showing the main parts, which correspond to those shown in FIG. 3, of an electronic camera according to still another embodiment of the present invention.

FIG. 9 is an enlarged sectional view showing the main parts, which correspond to those shown in FIG. 3, of an electronic camera according to still another embodiment of the present invention. This embodiment has a quick return mirror structure similar to that of the embodiment shown in FIG. 8, but differs from the embodiment shown in FIG. 8, in that part of incident light from the photographic lens system is utilized for AF (Automatic Focusing).

Specifically, a quick return mirror 91 formed of a half mirror is used as a light guiding device for guiding an object image incident from the photographic lens system toward a CCD image sensing element 30 and an optical finder unit 40. The mirror 91 is attached to a mirror frame 87 similar to that shown in FIG. 8, so that it is rotatable. An AF mirror 93 is disposed on the backside of the mirror 91 to reflect light passing through the half mirror 91. The AF mirror 93 is rotatably attached to the mirror frame 87 by an auxiliary frame 94, and is rotated simultaneously with the mirror 91 being rotated. To correspond to the AF mirror 93, a phase difference AF sensor module 96 of the TTL (Transistor-Transistor Logic) type is disposed on the bottom of a holding frame structure 32. The sensor module 96 receives reflected light from the AF mirror 93, and transmits it to an AF control circuit (not shown) to facilitate an AF operation.

In the embodiments shown in FIGS. 7 to 9, as a light guiding device for guiding an object image incident from a photographic lens system toward a CCD image sensing element 30 and an optical finder unit 40, a device different from that of the embodiment shown in FIG. 3 is used. However, even in these embodiments, a thick heat-transfer path is formed from the image sensing element 30 to the casing 13 of the camera body 12 and to the heat-radiating barrel 72 of the lens barrel 14, both having large thermal capacity, as shown in FIG. 2, via the holding frame structure 32 which includes, e.g., the heat-transfer frame member 61 having large thermal capacity. Since the heat generated by the image sensing element 30 is rapidly released to the outside of the camera through this heat-transfer path, it is possible to prevent a rise of the temperature of the image sensing element 30 and thereby prevent deterioration of the picture quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   a photographic lens configured to form an object image;
   an image sensing element configured to photoelectrically convert the formed object image;
   a light guiding device configured to guide incident light from an object, which is incident from the photographic lens, to a first optical path to the image sensing element and a second optical path different from the first optical path;
   a holding frame structure made of a heat-conducting material and configured to surround and fix the image sensing element and the light guiding device, so as to hold the image sensing element and the light guiding device in the electronic camera, wherein the holding frame structure comprises an intimately contacting member formed of a plate member larger than the image sensing element, made of a heat-conducting material, and intimately contacting with the image sensing element to transfer heat generated by the image sensing element, and a heat-transfer frame member made of a heat-conducting material and surrounding the light guiding device, such that the intimately contacting member and the heat-transfer frame member intimately contact with each other to transfer heat generated by the image sensing element through the intimately contacting member to the heat-transfer frame member;
   a lens casing configured to accommodate the photographic lens, the lens casing comprising a heat-radiating portion made of a heat-conducting material and configured to radiate heat to an outside of the camera and an outer casing accommodating the image sensing element;
   wherein the holding frame structure and the lens casing are arranged such that heat from the heat-transfer frame member is conducted to the heat-radiating portion of the lens casing.

2. The camera according to claim 1, wherein the light guiding device comprises an optical path switching device configured to switch first and second states in which the incident light is output to the first and second optical paths, respectively.

3. The camera according to claim 2, wherein the optical path switching device comprises a movable mirror.

4. An electronic camera comprising:
   a photographic lens configured to form an object image;
   an image sensing element configured to photoelectrically convert the formed object image;
   a light guiding device configured to guide incident light from an object, which is incident from the photographic lens, to a first optical path to the image sensing element and a second optical path different from the first optical path;
   a holding frame structure made of a heat-conducting material and configured to surround and fix the image sensing element and the light guiding device, so as to hold the image sensing element and the light guiding device in the electronic camera, wherein the holding frame structure comprises an intimately contacting member formed of a plate member larger than the image sensing element, made of a heat-conducting material, and intimately contacting with the image sensing element to transfer heat generated by the image sensing element, and a heat-transfer frame member made of a heat-conducting material and surrounding the light guiding device, such that the intimately contacting member and the heat-transfer frame member intimately contact with each other to transfer heat generated by the image sensing element through the intimately contacting member to the heat-transfer frame member;
   an outer casing configured to accommodate the image sensing element, the light guiding device, and the holding frame structure, the outer casing comprising a heat-radiating portion made of a heat-conducting material and configured to radiate heat to an outside of the camera; and
   a lens casing configured to accommodate the photographic lens, the lens casing comprising a heat-radiating portion made of a heat-conducting material and configured to radiate heat to an outside of the camera,
   wherein the holding frame structure, the outer casing, and the lens casing are arranged such that heat from the heat-transfer frame member is conducted to both the heat-radiating portion of the outer casing and the heat-radiating portion of the lens casing.

5. The camera according to claim 4, wherein the light guiding device comprises an optical path switching device configured to switch first and second states in which the incident light is output to the first and second optical paths, respectively.

6. The camera according to claim 5,
   wherein the optical path switching device comprises a movable mirror.

7. An electronic camera comprising:
   a photographic lens configured to form an object image;
   an image sensing element configured to photoelectrically convert the formed object image;
   a light guiding device configured to guide incident light from an object, which is incident from the photographic lens, to a first optical path to the image sensing element and a second optical path different from the first optical path;
   a holding frame structure made of a heat-conducting material and configured to surround and fix the image sensing element and the light guiding device, so as to hold the image sensing element and the light guiding device in the electronic camera, wherein the holding frame structure comprises an intimately contacting member formed of a plate member larger than the image sensing element, made of a heat-conducting material, and intimately contacting with the image sensing element to transfer heat generated by the image sensing element, and a heat-transfer frame member made of a heat-conducting material, and surrounding the light guiding device, such that the intimately contacting member and the heat-transfer frame member intimately contact with each other to transfer heat generated by the image sensing element through the intimately contacting member to the heat-transfer frame member; and an outer casing configured to accommodate the image sensing element, the light guiding device, and the holding frame structure, the outer casing comprising a heat-radiating portion made of a heat-conducting material and configured to radiate heat to an outside of the camera, wherein the holding frame structure and the outer casing are arranged such that the heat-radiating portion of the outer casing is thermally connected to the heat-transfer frame member, and heat from the heat transfer frame member is conducted to the heat-radiating portion of the outer casing.

8. The camera according to claim 7, wherein the light guiding device comprises an optical path switching device configured to switch first and second states in which the incident light is output to the first and second optical paths, respectively.

9. The camera according to claim 1, further comprising:

a second plate member made of a heat-conducting material, wherein the second plate member is directly and intimately connected to both the holding frame structure and the lens casing such that heat from the heat-transfer frame member is conducted to the heat-radiating portion of the lens casing via the second plate member.

10. The camera according to claim 9 wherein the second plate member is directly and intimately connected to the heat-transfer frame member.

11. The camera according to claim 4, further comprising:

a second plate member made of a heat-conducting material, wherein the second plate member is directly and intimately connected to all of (1) the holding frame structure, (2) the outer casing and (3) the lens casing such that heat from the heat-transfer frame member is conducted, via the second plate member, to both the heat-radiating portion of the outer casing and the heat-radiation portion of the lens casing.

12. The camera according to claim 11 wherein the second plate member is directly and intimately connected to the heat-transfer frame member.

13. The camera according to claim 7, further comprising:

a second plate member made of a heat-conducting material, wherein the second plate member is directly and intimately connected to both the holding frame structure and the outer casing such heat from the heat transfer frame member is conducted to the heat-radiating portion of the outer casing via the second plate member.

14. The camera according to claim 13 wherein the second plate member is directly and intimately connected to the heat-transfer frame member.

* * * * *